United States Patent [19]
Grenfell

[11] 4,001,666
[45] Jan. 4, 1977

[54] LOAD PEAK SHAVER POWER REGULATING SYSTEM

[75] Inventor: K. Pascoe Grenfell, Delanson, N.Y.

[73] Assignee: General Electric Company, Salem, Va.

[22] Filed: Apr. 3, 1975

[21] Appl. No.: 564,734

[52] U.S. Cl. .................................. 322/4; 310/74; 318/161; 318/197

[51] Int. Cl.² .................................. H02K 7/02

[58] Field of Search ............... 322/4; 318/150, 161, 318/197; 310/74, 113

[56] References Cited
UNITED STATES PATENTS

| 1,476,978 | 12/1923 | Jeffrey | 322/4 |
| 1,493,968 | 5/1924 | Davis | 322/4 X |
| 3,667,012 | 5/1972 | Kilgore | 318/161 |

Primary Examiner—Robert J. Hickey
Attorney, Agent, or Firm—Arnold E. Renner; Philip L. Schlamp

[57] ABSTRACT

A power regulating system controlling a flywheel-type load peak shaver is described wherein average power to a cyclic load is continuously subtracted from instantaneous load power to provide a command signal proportional to the required load peak shaver power flow. To this command signal is compared a feedback signal proportional to the power being supplied by the load peak shaver. The difference between the command and feedback signals controls the firing angle of a cycloconverter supplying power to the slip rings of the wound-rotor load peak shaver.

7 Claims, 4 Drawing Figures

LOAD PEAK SHAVER POWER REGULATING SYSTEM

BACKGROUND OF THE INVENTION

This invention relates generally to a power regulating system for a varying load and more particularly to an output power regulating system for a wound-rotor motor, flywheel-type load peak shaver. The purpose of the shaver is to provide locally to a cyclically varying load, such as a group of excavators, a predetermined portion of the instantaneous load power departures from average power. This relieves the utility lines of most of the short-cycle power swing magnitude, resulting in improved power plant operation, and in lower excursions of receiving-end line voltage.

Excavating machines, such as power shovels and draglines utilized by the mining industry, characteristically convert power with motor-generator sets driven by large synchronous motors, which draw and regenerate power in a cyclically varying manner during a digging cycle. For example, simultaneous acceleration of the hoist and swing motions of a large earth-moving dragline may briefly draw power as great as 165% of the rating of the synchronous motors while subsequent deceleration of the swing and hoist motions to standstill may regenerate power back into the utility lines equal to the motor rating. Thus, a peak-to-peak power swing of 265% of motor rating within a typical one-minute digging cycle is not uncommon. While such power swings can be easily absorbed by a power utility having a large generating capacity, excessive load fluctuations can cause boiler water level oscillation in steam stations when the cyclically varying load forms a significant percentage of the utility steam generating capacity. Because of the problems associated with boiler water level oscillations, e.g., carry-over of water through the turbine blades, etc., some power utilities have imposed severe penalty charges for excavator equipment tied to their power lines, where this equipment imposed short-term power swings in excess of a specified magnitude, said 15 megawatts.

The problem of cyclically varying loads produced by excavator equipment upon power lines heretofore has been attacked by various techniques in attempts to maximize utilization of utility power without incurring penalties. For example, it has been proposed to limit the maximum power flow to and from one or more excavators in a surface mine by continuously monitoring, on board each excavator, the total mine load. Excursions in mine power approaching specified limits would trigger automatic cut back in the available top speed of the excavator motion drives. This, however, places a restriction on production.

Statistical studies also have been made, where there are several excavators in one mine, to determine the probability of all excavators having synchronized severest digging cycles, such that worst-motoring peaks would occur simultaneously, as would worst-regenerative peaks. This would create the very maximum peak-to-peak mine load swing. These studies show the probability of occurrence of load swings of various magnitudes. There are so many digging cycles in one year that one chance in 10,000, say, of a severe peak-to-peak swing represents a recurring reality.

It is known to relieve the utility from large power swings created by excavator equipment through the utilization of a double-fed wound-rotor power converter to transform electrical power to kinetic energy during net regeneration from the excavator equipment. The kinetic energy then is stored by speed increase of a large flywheel mounted on the shaft of the wound-rotor converter, for transformation back to electrical energy during the subsequent motoring swing of the equipment.

A possible method for controlling the running power exchange between the load peak shaver and the power system would establish a power dead band within which the shaver would not give out or receive power. This band might be, say, plus or minus 7.5 megawatts (MW) to each side of the running average load from the mine. Mine power swings within this band would be totally absorbed by the utility. Any instantaneous power excursion in excess of 7.5 MW would ideally be totally provided by the load peak shaver. Such a system has the following deficiencies:

1. The load peak shaver is idle within the 15 MW band of power swings. Very high rate-of-change of mine power could be passed along to utility. (A better approach would be to use the shaver's capabilities partly to shave off even the smallest mine load swings.)

2. Within the dead band, there might be a large transient block of energy delivered to the mine at a power excursion level low enough so as not to exceed the dead band. The shaver speed could be creeping upwards towards it top limit during this time, since the power control issues no commands inside the dead band. A regenerative peak in excess of the dead band could then come along and call for flywheel acceleration to absorb the energy. Such an increase in speed might be in excess of the shaver rating and some suitable safeguard, such as a large dumping resistor to absorb regenerative energy in excess of that which drove the shaver speed to the top limit, might be required.

SUMMARY OF THE INVENTION

It is, therefore, an object of this invention to provide a power regulating system wherein even the smallest fluctuations in mine power are continuously calling for a preset, proportional contribution from the load peak shaver, in order both to eliminate shaver overspeed, and to help smooth out even small power fluctuations on the utility lines. Sharp rates of change of mine power would be filtered from the utility load.

The foregoing and other objects of this invention generally are achieved with a rotary load-peak-shaving power converter of large mass by continuous power regulation of the converter to generate or absorb a percentage of any load excursion beyond the running average (rather than operating the power converter only when the cyclic load exceeds a permissible zone). Thus, the power regulating system of this invention typically would allow the utility to supply a cyclically varying load with running average power, plus superposed short-term deviations not exceeding a specified power bandwidth. The load peak shaver is caused continuously to generate or absorb a sufficient portion of instantaneous mine load power excursions away from the running average, such that the portion of the excursions to be provided by the utility never exceed a specified bandwidth. Because of the large magnitudes of power to be regulated, the auxiliary load-peak-shaving power supply desirably is a power converter capable of converting electrical energy to kinetic energy of mass rotation. Means also are provided in the regulating system for detecting instantaneous power flow to the cyclically varying load and the auxiliary power supply means (the load peak shaver) is continuously regulated by means responsive to the measured instantaneous load power to generate or absorb power in amounts proportional to the instantaneous excursion of the cyclically varying load from average.

BRIEF DESCRIPTION OF THE DRAWINGS

Although this invention is described with particularity in the appended claims, a more complete understanding of the invention may be obtained from the following detailed description of a specified embodiment of the invention when taken in conjunction with the accompanying drawing wherein:

DETAILED DESCRIPTION

Figure 1:
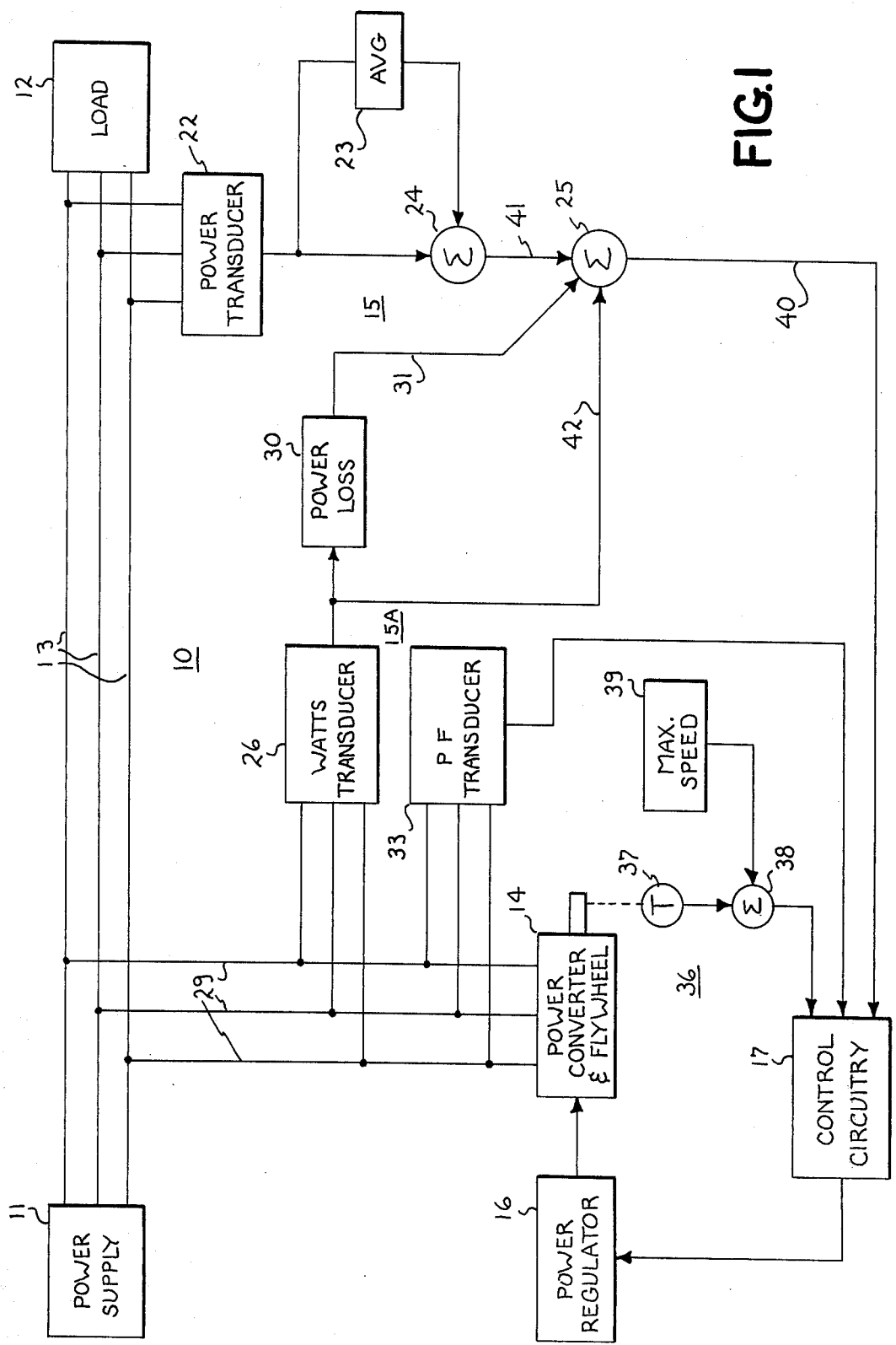
FIG. 1 is a simplified schematic diagram of a power regulating system is accordance with this invention.

The basic components of a power regulating system 10 for inhibiting inordinate fluctuations in power flow from a utility power supply 11 to a cyclically varying load 12 over 3-phase power lines 13 are illustrated in FIG. 1 and generally include an auxiliary power converter 14 connected to the utility power lines, a power sensing system 15 to continuously detect instantaneous excursions from average load, a converter power measurement system 15A, control circuitry 17, a power regulator 16, and a speed reset 36. The power flow to or from auxiliary power converter 14 is adjusted by regulator 16 in response to the output signal from control circuitry 17 in an amount proportional to the actuating signal (the difference between the derived mine power excursions from average and the measured converter power) to continuously generate or absorb a fixed percentage of the load power excursion. The quantity of power provided by utility power supply 11 thus can always be maintained within a predetermined range about an average load.

Figure 2A:
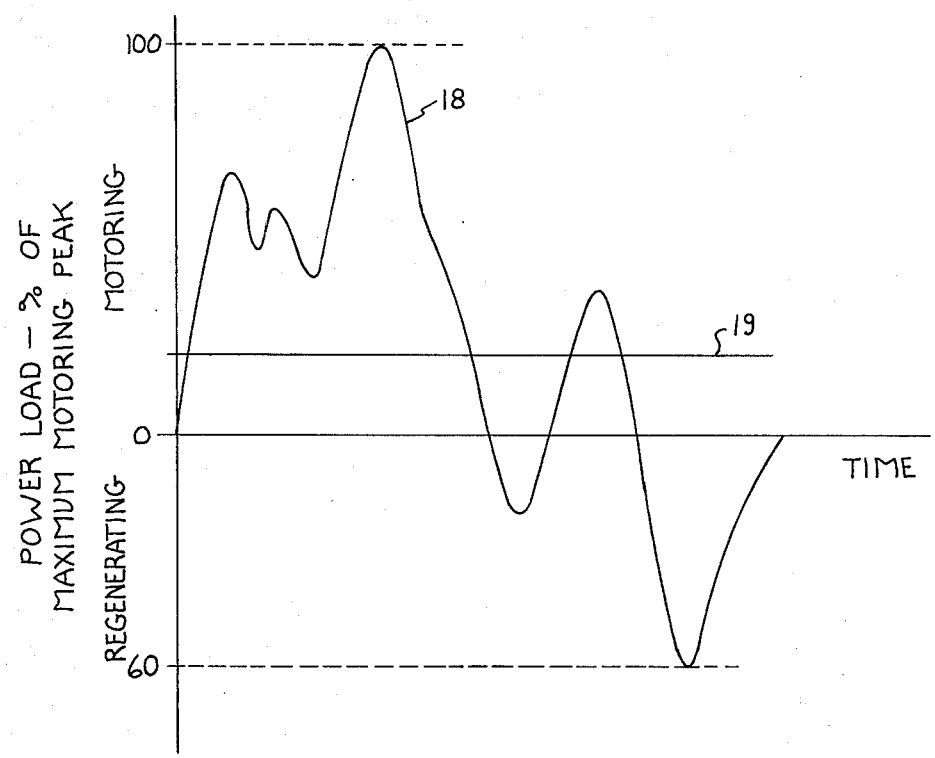
FIGS. 2A and 2B are pictorial illustrations of the cyclically varying load produced by excavator equipment upon a power system; and, FIG. 3 is a schematic diagram of a preferred power regulating system in accordance with this invention.

The typical digging cycle of a single power excavator, illustrated by curve 18 of FIG. 2A, is known to vary in a substantially cyclic manner about an average load, represented by line 19. As illustrated, motoring power initially is drawn by the excavator to produce in part, kinetic energy in the motion drives, and some of this kinetic energy is subsequently converted back to electrical energy during slowdown of the excavator motions to regenerate power back into power lines 13. When a plurality of power excavators are connected to a single power supply, the excavators appear as a random load 20, illustrated in FIG. 2B, which varies about an average load identified by reference numeral 21. Where power swing magnitudes are a problem, a utility may specify a range, e.g., ±7.5 MW, illustrated by the band defined by the dashed lines U and L in FIG. 2B, about this average power for permissible cyclic variations. Any excursions beyond this range will result in the assessment of a penalty charge against the mining company. Auxiliary power supplies of the prior art normally are inactive until the cyclic load exceeds the specified power range, whereafter the auxiliary power supply is regulated, e.g., by power control of a wound rotor converter, to absorb or generate the total power excursions beyond the specified range. Applicant's power converter, however, is continuously operative for any excursions above or below average load (line 21 of FIG. 2B) to supply or accept a fixed percentage of the excursion, notwithstanding the fact that the excursion is within the permissible range specified by the utility. Thus, if the average load for all power shovels is $x$ KW, the range specified as acceptable by the utility is $\pm y$ KW, and the maximum possible motoring power to the mine is $Z_M$ KW, power converter 14 would be designed to provide a maximum momentary power contribution of at least $Z_M - (x + y)$. At other levels of Z, the contribution would be at least $$\frac{y}{Z_M - x} \cdot (Z - x).$$

To achieve continuous control over the power swings on the utility power supply 11 (illustrated in FIG. 1), power flowing to cyclically varying load 12 along power lines 13 is continuously monitored by a power transducer 22, with the output of the transducer being fed to a suitable integrator circuit 23 wherein power flow to the load is summed over a predetermined interval, typically less than one minute, to provide an output signal indicative of average power flow to load 12. The output from integrator circuit 23 is compared in summing circuit 24 to the instantaneous load power measured by power transducer 22 to produce an output signal (line 41) proportional to the difference between instantaneous power flow to the load and average power flow to the load. This difference signal is fed as a power command to a second summing circuit 25 for summing with a signal (line 42) indicative of the power presently being supplied (or absorbed) by converter 14 as measured by a watts transducer 26 and a second signal via line 31, to be described hereinafter, to produce an actuating signal 40 which is forwarded to controller 16 to vary the power of the converter 14 by an amount and in a direction to permit the power converter to take a fixed percentage of the excursion from average load (line 21 of FIG. 2B).

Integrator circuit 23 generally may be any digital or analog integrator capable of averaging power flow over a predetermined period to obtain a continuously updated running average of power flow to load 12. The integrating period for the circuit should be sufficiently long to measure the true average power flow to the load, while being short enough to permit a rapid response should one of the power excavators be shut down, dropping the average load from solid horizontal line 21 to a new average load, as illustrated by the dotted line 21A in FIG. 2B. In general, an integrating period between approximately 25 and 75 percent of an average digging cycle is desirable for integrator circuit 23, i.e. an integrating time period typically between 15 and 45 seconds.

Figure 2B:
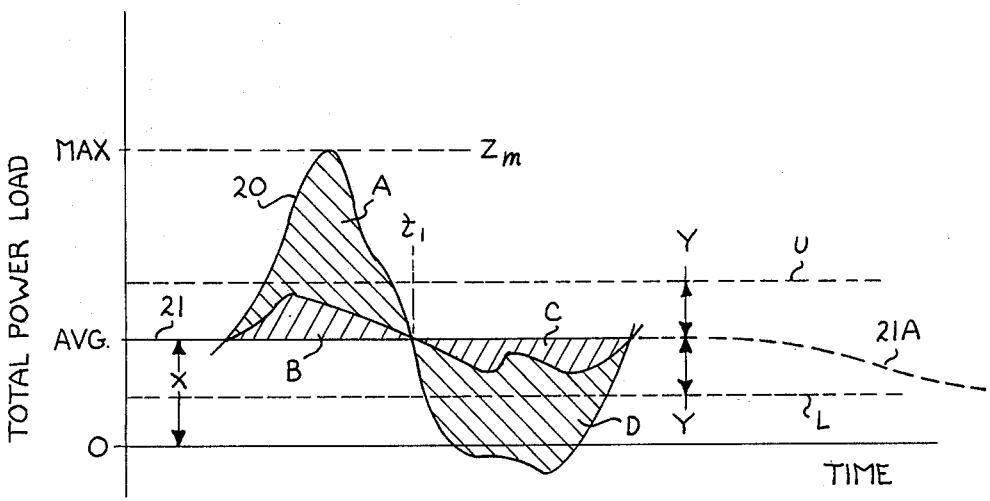

Preferably, the rotary power converter utilized to absorb or generate a fixed percentage of load excursion from average is characterized by a large rotating mass (e.g., a flywheel) to permit storage of energy in kinetic form during regenerative cycles of the power excavators, for subsequent return to power lines 13 during motoring cycles of the excavators. In general, the power converter is an adjustable speed a.c. machine in order to allow energy storage in the attached flywheel with speed increase, or energy release back to the power system by flywheel slowdown. A doubly-fed a.c.

induction motor, with would stator and rotor, is ideal for this purpose. The converter's designed speed range is best centered around rated synchronous speed, with the same percentage excursion above and below synchronism. In decelerating from top rated speed to minimum rated speed, the flywheel must give up enough kilowatt-seconds of energy to provide a sufficient share of the maximum expected mine motoring energy above the running average power. This share would restrict the maximum utility power excursion away from average $x$, to within the allowable limit, $\pm y$ (FIG. 2B). This kilowatt-second share of flywheel energy is illustrated as area A in FIG. 2B, the plot of instantaneous mine power 20 versus time. Area B is the utility's share of the total mine incremental energy requirement A plus B. When mine power drops below the running average at time $t_1$, the power control for the load peak shaver now calls for absorption of energy area D by acceleration of the flywheel. The utility is caused to absorb its share, energy area C. Area A generally equals area D because the integrator 23 continuously updates the average power analog signal, which determines when energy should be absorbed or given out. Correspondingly, utility energy area B generally equals area C, and area A plus B equals area C plus D.

Since there is continuous monitoring of instantaneous and average mine power, unlike the blindness of the previously described dead-band system, the flywheel speed cannot exceed the design limits as long as power and energy swings are within predicted limits.

A slow-acting speed-reset function 36 (FIG. 1) continuously urges the flywheel to work back up to top-rated speed. Normal power demands overpower this signal, but should all excavators be shut down, the flywheel speed will rise to top-rated, in readiness for restarting of the mine. The first flow of energy at mine start-up must always be toward the mine, calling for flywheel deceleration. The only energy that the mine can pump back, is some of that which was delivered to it and stored in the inertia of moving parts.

The speed regulating sensor generally includes a tachometer 37 connected to the shaft of power converter 14 to measure the speed of the converter, and a summing circuit 38 wherein the output signal from the tachometer is compared to a fixed signal from maximum speed reference circuit 39 to produce an output therefrom proportional to the deviation of power converter speed from maximum. The output signal from summing circuit 38 then is fed to control circuit 17 to increase the speed of the power converter to the design limit of the converter over a relatively long period, e.g., 10 minutes, in order not to significantly interfere with the more rapid speed changes produced by the actuating signal from summing circuit 25.

Under power-flow control, the speed of the motor-flywheel auxiliary power converter 14 is forced to change in the desired direction by raising or lowering the frequency of the secondary voltage applied to the rotor circuit. For best equipment usage, the magnitude of the impressed secondary voltage must be approximately proportional to the secondary frequency, giving nearly constant volts per Hertz. There will be a power flow into the rotor, or out from it, as a function of the specific speed level, shaft torque magnitude, and shaft torque direction demanded by the primary power regulator. This follows established laws applicable to double-fed induction machines. The source of this adjustable frequency, adjustable voltage power can be either an adjustable speed a.c. rotating machine or a static power converter using solid-state, adjustable-firing-point thyristors, such as cycloconverter. The latter is a more practical approach.

The motor-flywheel auxiliary power converter dissipates continuous and changing losses in the form of bearing friction, windage, hysteresis, eddy current, and conductor resistance. This component power usage must be allowed by the regulating system to flow from the power line, and not be permitted slowly to drag down the average flywheel speed. Were the latter to happen, the flywheel slowdown needed to provide motoring energy to the mine would soon bring the speed of the converter below its minimum allowable value, at which the voltage and frequency on the cycloconverter power regulator have reached their maximum design values.

In order to make the power converter take its loss energy from the power line rather than from the flywheel, the power regulator must be instructed, by increment to actuating signal (line 40), to allow this loss power to be added as an incremental motoring power component from the a.c. line. The incremental actuating signal is generated as a "feed-forward" signal (line 31) into summing circuit 25. Loss power is measured by suitable means 30 by integrating (summing) total converter power over prescribed, successive periods of time. This gives running average power, which must equal converter loss power.

Because the synchronous machine generally employed to drive the motor-generator sets in large excavators have reactive power regulators for voltage drop control, it is desirable that power converter 14 contribute and absorb power at unity power factor. To assure such result, the power factor of power flowing on auxiliary power lines 29 to converter 14 is measured by a power factor transducer 33, and a signal proportional to the power factor is fed to control circuitry 17. Here it is compared to a unity power factor reference signal (not shown). Any difference between the two causes appropriate adjustment of the volts per Hertz to restore unity power factor.

Figure 3:
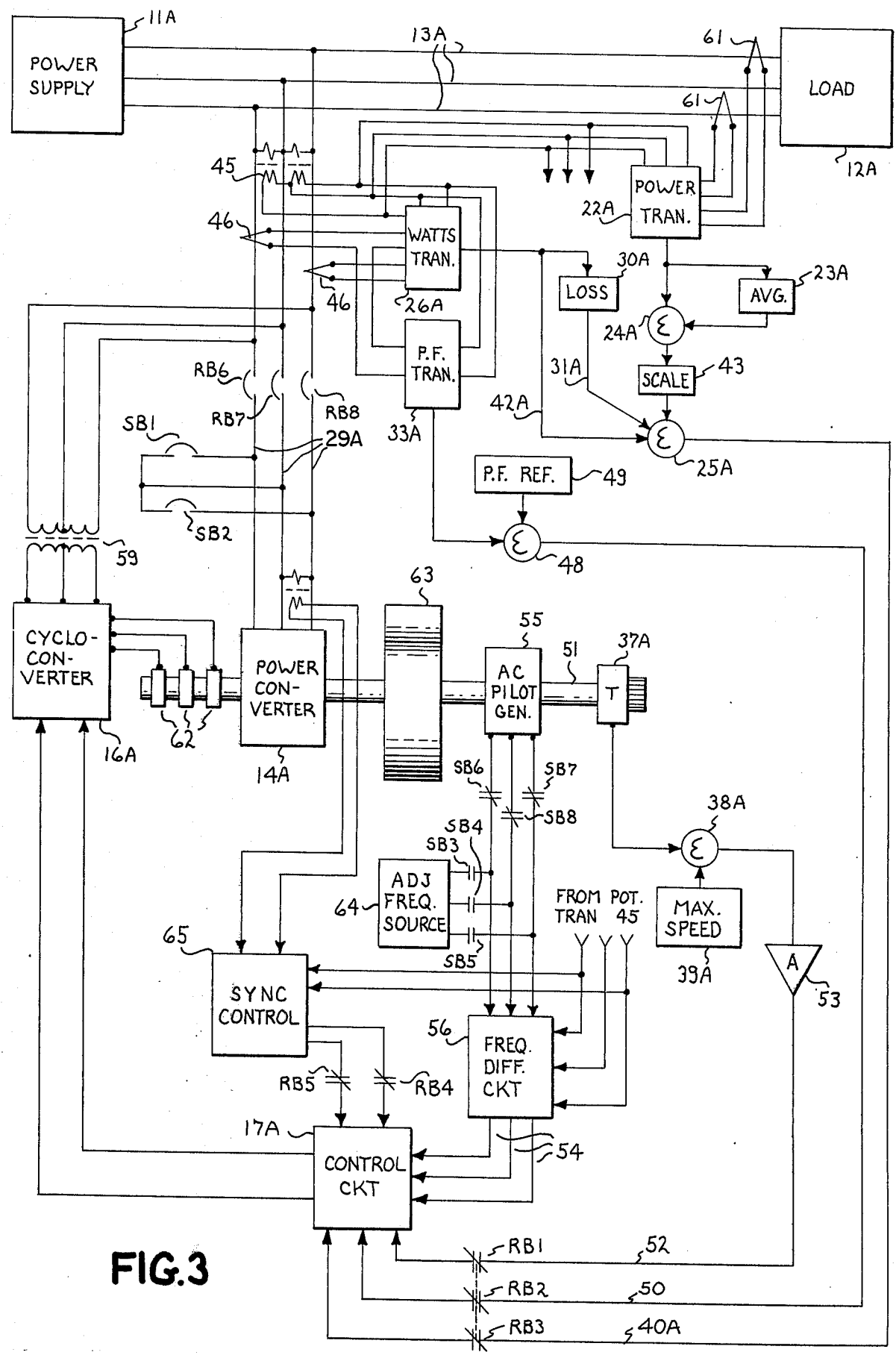

A regulating system for controlling power excursions utilizing a wound rotor converter is illustrated in FIG. 3 wherein reference numerals corresponding to those utilized in FIG. 1 are utilized for corresponding components. The utility power supply 11A is fed over the three-phase power line 13A to a multi-excavator equipment load 12A with power flow on the power line being measured by power transducer 22A having inputs from potential transformers 45 and current transformers 61. The output from the power transducer then is fed to a running average calculator 23A and as one input to summing circuit 24A wherein the instantaneous power on the line (as measured by power transducer 22A) is compared with the average power derived over a predetermined prior interval, i.e., the integrating period of calculator 23A. After the output signal from the summing circuit 24A is scaled by a ratioing element 43 to the preset portion of the mine power excursion-from-average that it is desired that the load peak shaver should produce, the scaled signal is forwarded to summing circuit 25A for comparison with a feedback signal (line 42A) proportional to present power flow between wound rotor converter 14A and power lines 13A via auxiliary power lines 29A. This feedback signal is modified in junction 25A by a small signal from a converter average loss calculator 30A, to allow the converter always to receive a component of power for its losses, without interfering with converter speed range.

Power flow on auxiliary power lines 29A is measured in conventional fashion by potential transformers 45 and current transformers 46 to produce an output signal from watts transducer 26A, which output signal is fed to summing circuit 25A via the line 42A. The output signal from the watts transducer 26A also is fed to the average loss calculator 30A, to generate the signal (line 31A) indicative of the d.c. power required from the utility power supply to overcome such losses as windage and friction in the wound rotor converter. The signal from average loss calculator 30A is summed with the output signals from watts transducer 26A, and ratio device 43 in summing circuit 25A to produce a composite actuating signal for control circuitry 17A (line 40A). This d.c. actuating signal then is utilized by the control circuit to determine the degree of speed adjustment required for the converter.

The power factor of the total power flowing along auxiliary power supply lines 29A is measured by power factor transducer 33A, and the output signal generated therefrom is combined in summing circuit 48 with a power factor reference signal from a source 49. Any difference between the two signals is transmitted (line 50) to control circuit 17A for power factor adjustment purposes (as will be more fully explained hereinafter).

A third regulating input signal to control circuit 17A via line 52 is a speed signal obtained from a d.c. tachometer 37A geared to shaft 51 of the wound rotor converter. The output signal from the tachometer is compared in summing circuit 38A with a speed reference signal, i.e., a signal equal to the output signal from the tachometer at maximum design speed of the wound rotor converter, from circuit 39A to produce an output signal from the summing circuit proportional to the variation between the actual speed of the wound rotor converter and the maximum design speed of the converter. This output signal then is amplified in amplifier circuit 53 before being fed as a speed regulating input to control circuit 17A. Because the speed regulating input to control circuit 17A is designed to increase the speed of the wound rotor converter over a relatively long period (compared to the more rapid response desired for the power regulating input signal from summing circuit 25A), a substantial, e.g., at least a two fold and preferably a ten-fold, amplitude difference should exist between these signals for the same rpm speed correction.

Control circuit 17A also receives a three-phase input over lines 54 proportional to the slip frequency of the wound rotor converter. The slip frequency is obtained in conventional fashion by comparing the frequency of the rotor, as measured by an a.c. pilot generator 55 mounted upon the rotor shaft, with the frequency of auxiliary power lines 29A in polyphase frequency difference circuit 56.

Cycloconverter 16A functions substantially as an amplifier for the control voltage and frequency signals from amplitude and phase control circuit 17A to apply power received from a transformer 59 to the rotor of the wound rotor converter at an amplitude, frequency and phase angle equal to that of the control voltages. Typically, threephase cycloconverters for speed control purposes comprise three sets of back to back SCR's, i.e., one set for each phase of the three-phase output, triggered into conduction at instants determined by the triggering pulses to the gate terminals of the SCR's, to produce output power voltage and frequency from the cycloconverter of either phase rotation, or direct current. Because cycloconverters for speed control of wound rotor motors are well-known in the art, a detailed description of the internal circuitry of the cycloconverter is not believed to be warranted.

The output power from the cycloconverter is fed to the rotor of the wound rotor converter through slip rings 62 to establish a rotating magnetic field that revolves in synchronism with the stator magnetic field created by the constant frequency power supply on lines 29A. Since the rotor is mechanically free to rotate under normal operating conditions, the rotor moves at a velocity and in a direction to lock the rotor and stator field in synchronism, i.e, the wound rotor machine tends to operate as a synchronous motor.

By advancing or retarding the phase angle of the rotor power supply voltage relative to the emf induced in the rotor by the stator flux wave, the rotor current and its associated flux can be changed. The resulting interaction with the stator field causes decelerating or accelerating torque to be developed, thereby altering the speed of the rotor. As the rotor speed changes, the new induced slip frequency is exactly matched by a new cycloconverter output frequency, since the cycloconverter receives its frequency-generation command from the difference between a.c. line frequency and shaft speed frequency. As the speed changes, power flows between flywheel 63 mounted on rotor shaft 51 and the utility power supply, i.e., power flows from the flywheel to power lines 13A during periods of high mine motoring load and from the power lines into flywheel kinetic energy during regenerative periods of load 12A. By speed regulating of the wound rotor converter in the foregoing manner, the converter can be made to generate or absorb a fixed percentage of power deviations from average load.

There are several means of bringing the woundrotor converter up to speed, taking into account the very large inertia of the rotor plus the flywheel such as:

1. A completely separate starting motor clutched during acceleration to shaft 51.
2. Stepped secondary resistance control on the wound rotor motor.

A preferable method, from the standpoint of much faster acceleration, is to apply increasing frequency power to the rotor through the cycloconverter. The stator windings are isolated from their normal power supply, and shortcircuited to each other, forming an "inside-out" motor. Switching to accomplish this involves opening of running breaker power contacts RB6, RB7, RB8; and closing starting breaker power contacts SB1 and SB2.

Control contacts RB1, RB2, and RB3 are opened to isolate the normal command signals. Contacts RB4 and RB5 are closed to establish identical voltage magnitude, frequency, and phase angle on both sides of the running breaker power contacts just prior to synchronism.

Control contacts SB3, SB4 and SB5 close to apply an increasing frequency signal from a source 64 to the adjustable amplitude and phase control circuitry 17A. The a.c. pilot generator 55 is meanwhile isolated by SB6, SB7 and SB8 contacts. The adjustable frequency source 64 starts out at line frequency. This, when subtracted in the difference circuit 56 from actual line frequency, applies d.c. to 17A. This corresponds to the converter at rest.

The cycloconverter might be designed with a frequency range of zero to 15 Hertz, in order to cover an operating speed range corresponding to 60 Hz plus 15 Hz, down to 60 Hz minus 15 Hz.

The converter is initially accelerated from rest (zero cycloconverter frequency) up to 15 Hz, or 25% of synchronous speed, under regulated current control, by reducing the frequency output of the adjustable frequency source 64. Constant accelerating torque at rated value is maintained with constant rotor volts per cycle (constant gap flux). Further acceleration to 75% of synchronous speed is achieved with increasing cycloconverter output frequency up to, say 45 Hz, but at constant cycloconverter volts. This portion of the acceleration is at constant horsepower, with the gap flux decreasing as speed increases.

At 75% of synchronous speed, the stator phase terminals are unshorted by opening of starting breaker power contacts SB1 and SB2. The cycloconverter is then commanded to produce 15 Hz with proper phase rotation to generate a flux wave on the rotor with forward direction of rotation. This, added to the 45 Hz mechanical speed, produces 60 Hz on the open stator terminals. A synchronizing control 65 which receives inputs from lines 29A now enforces identical frequency, voltage magnitude, and voltage phase angle on both sides of the running breaker RB6, RB7, and RB8. The breaker is caused automatically to close at the right instant without any line current transients.

From this point on, the speed regulator brings the converter up to top speed of, say, 75 Hz (25% above synchronism) in preparation for normal power operation.

While a preferred embodiment of this invention has been illustrated and described, it will be understood from the foregoing that various alterations can be made in the disclosed regulating system without departing from the broad concepts of this invention. For example, a flywheel motor-generator set could be mounted on each excavator to smooth the power flow to the individual excavators rather than utilizing a central power converter to smooth total utility power flow. The appended claims therefore are intended to cover all such changes and modifications as fall within the true spirit and scope of this invention.

What is claimed is:

1. A power regulating system for a cyclically varying load comprising:
   a. main power supply means connected to said load, said main power supply means being capable of supplying average power to said cyclically varying load and having a predetermined range about the average power within which range power excursions of short durations may permissibly occur;
   b. means for measuring instantaneous power flow to said load;
   c. means for measuring power to said load over a predetermined interval to obtain average power flow to said load;
   d. means for comparing instantaneous power flow to said load with average load power to produce a difference signal representative of instantaneous power excursions from the average load;
   e. auxiliary power supply means connected to said main power supply means; and,
   f. means responsive to said difference signal for regulating said auxiliary power supply means to continuously generate or absorb power in a predetermined percentage of the excursions of instantaneous power from average power.

2. A power regulating system for a cyclically varying load according to claim 1 further including means for continuously measuring power generated or absorbed by said auxiliary power supply means, means for comparing the measured auxiliary power supply power with said difference signal representative of instantaneous power excursions from average, and means for altering the output from said auxiliary power supply means by an amount proportional to the variation between said difference signal and a signal proportional to said measured power of said auxiliary power supply means.

3. A power regulating system for a cyclically varying load according to claim 2 wherein said auxiliary power supply means is a dynamoelectric machine capable of absorbing and generating power by transformation of energy between the electrical and kinetic states and further including speed measuring means for determining the rotary speed of said dynamoelectric machine, means for comparing the measured speed of said dynamoelectric machine with the maximum operating speed of said machine and means responsive to the measured speed for slowly raising said machine to the maximum operating speed of the machine when power command signals are not present.

4. A power regulating system for a cyclically varying load produced during the digging cycle of excavator equipment comprising main power supply means having a capacity sufficient to supply average load of said excavator equipment while being incapable of sustaining cyclical variations exceeding a predetermined range about said average load, means for detecting the average load of said excavator equipment over a period of time less than the normal digging cycle of said excavator equipment, means for continuously measuring the instantaneous load of said excavator equipment and for continuously comparing said instantaneous load with the average load of said excavator equipment to provide a measured difference therebetween, auxiliary power supply means connected to said cyclically varying load, said auxiliary power supply means being capable of a mutual transformation of energy from the kinetic to the electrical state and being characterized by a rotary mass for storage of kinetic energy, means for measuring power flow between said auxiliary power supply and said cyclically varying load, means responsive to power flow between said cyclically varying laod and said auxiliary power supply means and to the measured difference between instantaneous load and average load of said excavator equipment for continuously regulating the power flow of said auxiliary power supply means to generate or absorb power from said auxiliary power supply means in a predetermined percentage of the instantaneous excursions of the cyclically varying load from average load.

5. A power regulating sysem according to claim 4 further including means for measuring power losses within said auxiliary power supply and means for summing said power losses with measured power flow between said auxiliary power supply and said cyclically varying load to obtain a total power flow signal for comparison with the signal representative of instantaneous excursions from average load.

6. A power regulating system according to claim 4 wherein said auxiliary power supply means is a wound rotor converter having a flywheel mounted thereon and further including means for measuring the speed of said wound rotor converter, means for comparing said measured speed with a signal proportional to the maximum design speed of said wound rotor converter, and means responsive to said comparison means tending to drive said wound rotor converter slowly to said maximum design speed when power flow command signals are not present.

7. A power regulating system according to claim 6 wherein said means for continuously regulating the load flow of said auxiliary power supply means is a cycloconverter triggered by an adjustable control circuit, the input to said control circuit comprising a first signal proportional to the difference between instantaneous load and average load, a second signal proportional to the power factor of the power flowing between said auxiliary power supply means and said load, a third signal proportional to the difference between rated maximum converter speed and its instantaneous actual speed, and a fourth signal proportional to the slip frequency between the rotor frequency of said wound rotor converter and the frequency of the signal generated by the stator of said wound rotor converter, said control circuit producing an output triggering signal for said cycloconverter proportional to the magnitudes of said first, second and third signals at a frequency equal to the slip frequency of said wound rotor converter.

* * * * *